Oct. 30, 1962     L. P. SCHAEFFER     3,061,210
MATERIAL HANDLING MACHINE
Filed Sept. 29, 1961     4 Sheets-Sheet 4
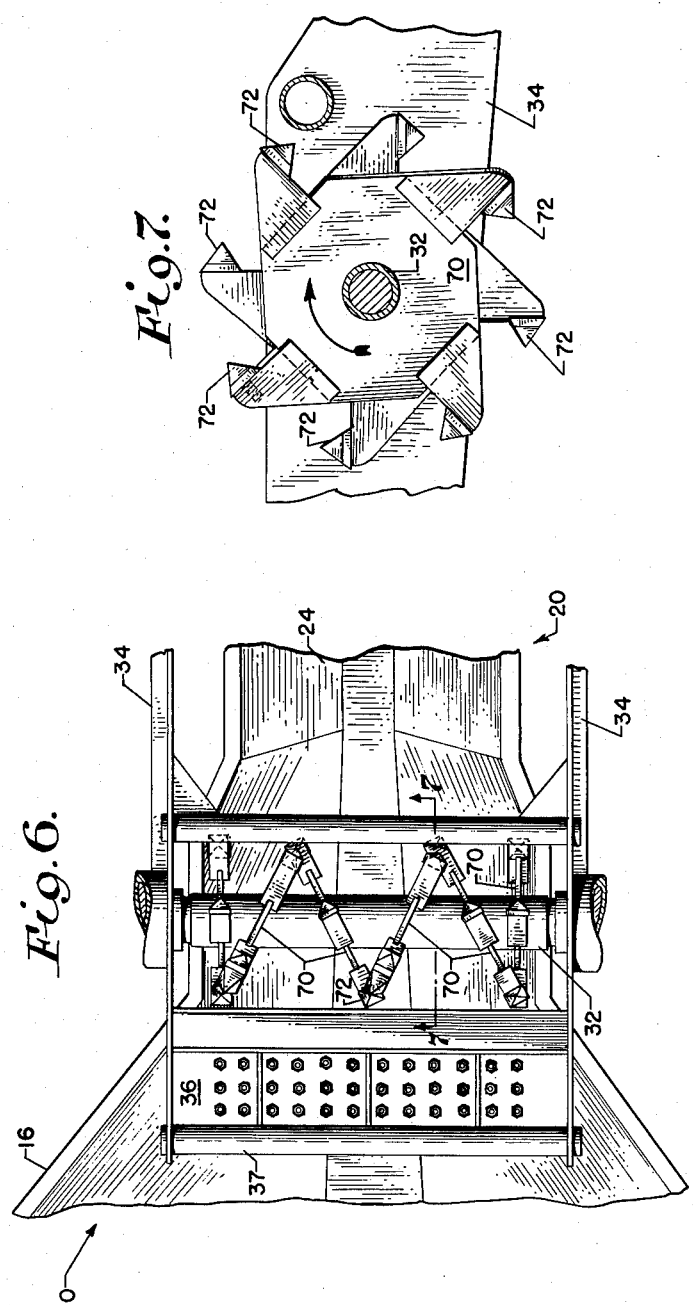
INVENTOR.
LOUIS P. SCHAEFFER
BY
Bean, Brooks, Buckley + Bean
ATTORNEYS

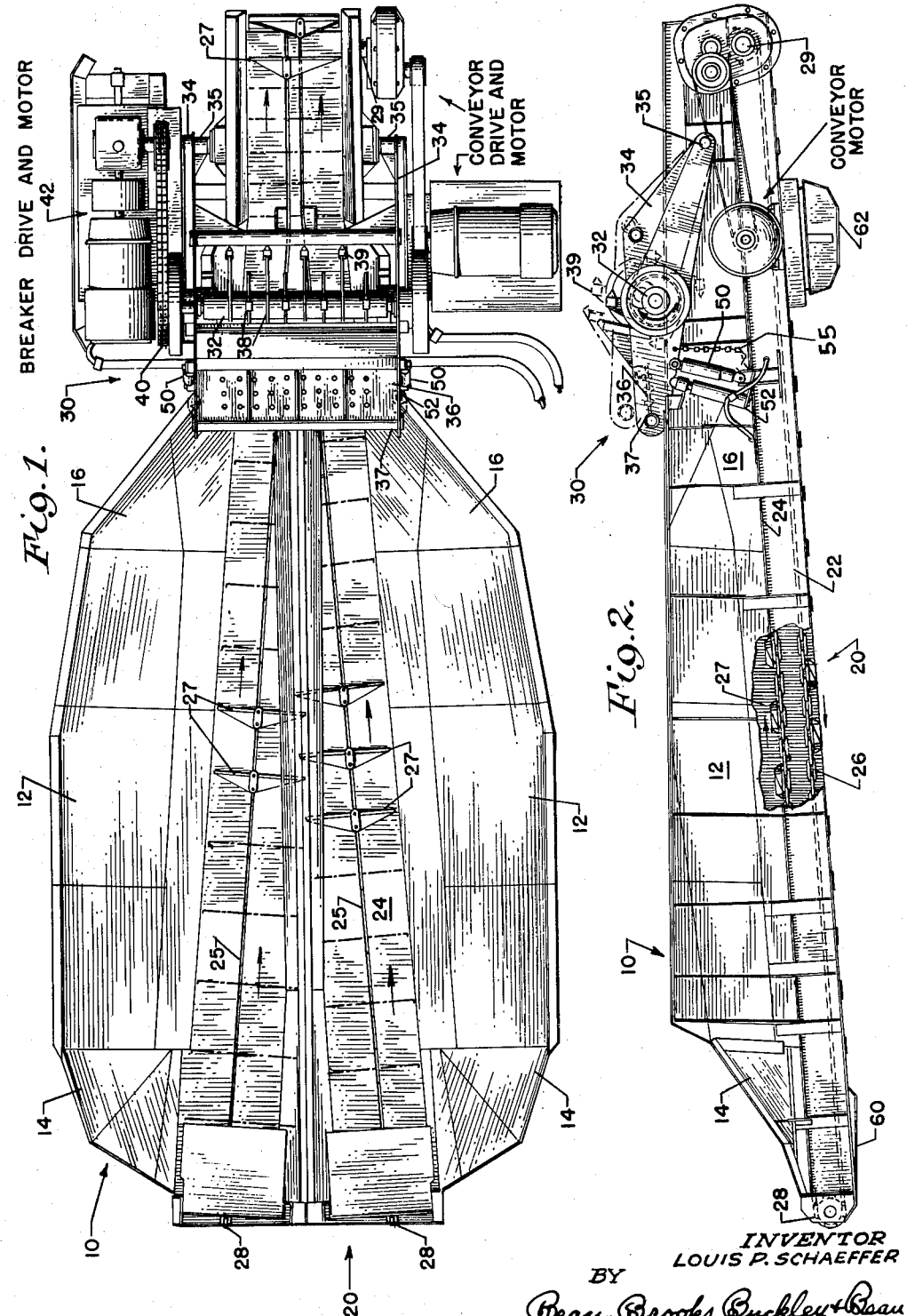

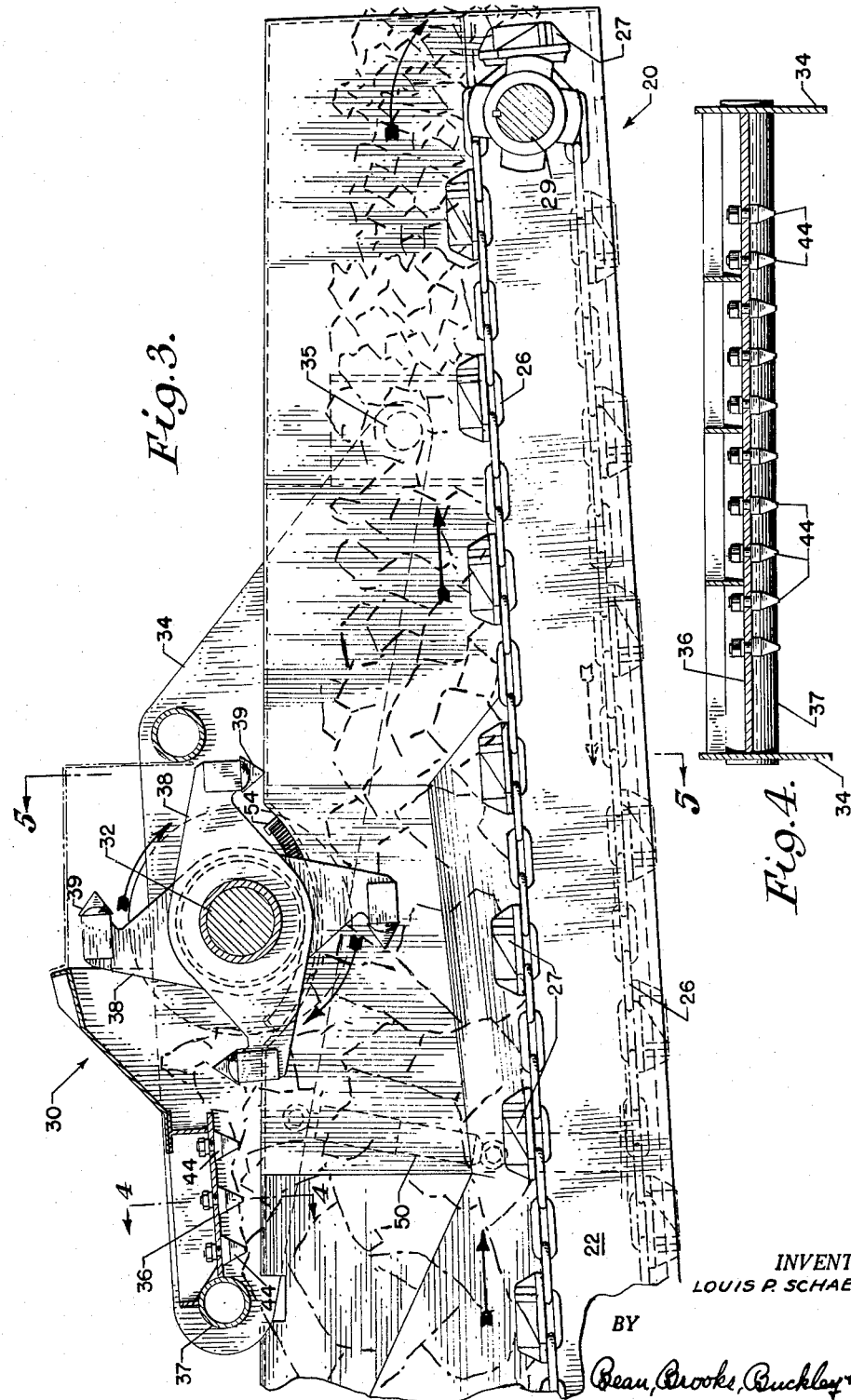

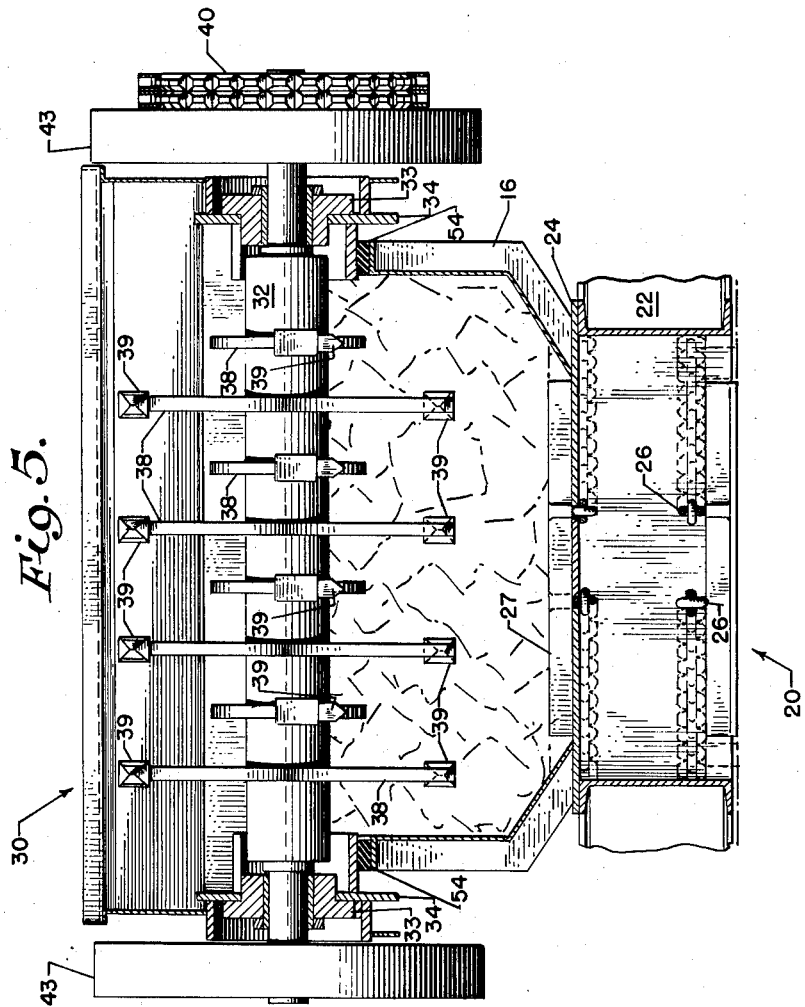

United States Patent Office 3,061,210
Patented Oct. 30, 1962

3,061,210
MATERIAL HANDLING MACHINE
Louis P. Schaeffer, Williamsville, N.Y., assignor to Columbus McKinnon Corporation, Tonawanda, N.Y.
Filed Sept. 29, 1961, Ser. No. 141,788
8 Claims. (Cl. 241—189)

This invention relates to a new and improved machine for reception of assorted size material such as run-of-mine coal or the like including substantial portions of oversized lumps; the machine including means for feeding the material into an improved type breaker component of the machine, and finally delivering it in the form of a substantially uniformly sized and mixed product at a substantially constant and leveled off rate of delivery. One example of a machine of the invention is illustrated in the accompanying drawing wherein:

FIG. 1 is a top plan view of a machine of the invention;

FIG. 2 is a side elevation thereof;

FIG. 3 is a fragmentary vertical section enlarged scale through one end of the machine;

FIG. 4 is a fragmentary section taken along line IV—IV of FIG. 3;

FIG. 5 is a section taken along line V—V of FIG. 3;

FIG. 6 is a fragmentary plan view showing an alternative construction of one component of the machine; and FIG. 7 is an enlarged scale fragmentary sectional view taken along line VII—VII of FIG. 6.

As shown in the drawings herewith the machine of the invention may be arranged in combination with mutually cooperative components including a batch receiving hopper as designated generally at 10; a material gathering and flow integrating conveyor component as indicated generally at 20; and the improved oversize lump breaking and material tilling component (hereinafter sometimes referred to as "breaker component") as indicated generally at 30. As shown in FIGS. 1, 2, the hopper component 10 comprises oppositely disposed vertically and laterally inclined side wall portions 12—12 attended at opposite ends by "gathering" end wall portions 14 and throat walls 16. The hopper parts are arranged to substantially enclose the generally spear-shaped (in plan view) conveyor component 20, and thus there is provided a generally dish-shaped hopper structure enveloping the feed intake portion of the conveyor component. The hopper structure may of course be fabricated in any preferred form of sheet metal and stiffener construction such as illustrated herein by way of example only.

The conveyor component 20 of the machine of the invention comprises essentially a box-sectioned keel structure 22 which is spear-shaped in plan view and includes a top plate 24 which is formed as shown in FIG. 1 with a pair of convergently related slots 25—25 through which protrude portions of endless conveyor chains 26—26. The chain links are fitted at intervals therealong with brackets carrying transversely disposed scraper flights 27. The conveyor chains 26—26 are separately trained around suitable pocket wheels or sprockets at the front and rear ends thereof so that the return strand of each conveyor chain is disposed substantially vertically below the working strand of the chain. At the intake end of the machine the chains 26—26 train around separate idler wheels 28—28; while at the delivery end of the machine the sheave arrangement for the conveyor chains may comprise a single wheel 29 having closely disposed parallel rows of pockets for receiving the chains in geared relation to the wheel. The shaft carrying the wheel 29 is power driven as through means of a speed reducer and motor device as indicated for example in FIGS. 1–3.

As shown in FIG. 1, the conveyor component is arranged so that the left hand end or feed intake portion thereof the conveyor chain devices are substantially spaced apart, compared to their relative arrangement at the discharge end of the machine. Also it will be noted that the conveyor scraper devices 27 are mounted on the chains 26—26 in such manner that the scrapers intermesh without mutual interference as they are pulled by the chains toward the discharge end of the machine, and thence around the sheave at that end of the machine.

Thus, by virtue of this arrangement relatively large batch loads of run-of-mine coal or the like may be periodically dumped into the feed end portion of the hopper 10, or at the left hand portion thereof as viewed in the drawing herewith, and the constantly running conveyor devices will then pick up the coal and move it toward the breaker component of the machine in the form of a substantially constantly moving stream. Throughout this process the funneled front wall portions 16 of the hopper structure will function to choke off any massive movements of the coal load towards the breaker, while the sloping side walls of the hopper structure function to keep the conveyor supplied with coal from the upper side portions of the hopper whenever the conveyor gets ahead of the coal load immediately thereon.

The breaker component of the machine comprises essentially a rotor which is power-driven independently of the conveyor drive; the rotor being disposed above the conveyor component adjacent the delivery end thereof and in the region where the conveyor component is constricted in plan view and is thus delivering a uniform stream of material. Thus, as shown in FIGS. 1–5, the rotor device may comprise essentially a shaft 32 journaled in bearings 33—33 carried in beams 34—34 which are pivotally mounted as indicated at 35—35 from opposite sides of the conveyor keel structure. The beams 34—34 also extend rearwardly from the position of the rotor 32 thereon to provide support for a breaker plate 36 (FIGS. 3, 4) which is mounted to lie flatwise and spanwise therebetween. Tubular brace bars as indicated at 37 may be employed to reinforce the assembly and to augment the support for the breaker bar 36.

The rotor 32 is supplied at intervals therealong with radial arms 38 carrying breaker points 39 which are pointed in the direction of rotor rotation. As indicated at 40 the rotor may be arranged to be driven by means of a chain belt or the like and a motor-gear box unit as indicated at 42. It will be noted that the arrangement of the breaker and its rotation is such that the breaker arms dig into and "till" the coal feed being carried through the "throat" of the machine by the conveyor as it passes under the breaker in addition to impacting against the oversize lumps of material. Any oversize lumps not immediately reduced by the impacts of the breaker points are dug out of the body of the conveyor load and are driven upwardly therefrom and are slammed against the breaker bar 36.

As indicated at 44 the breaker bar 36 may be provided with spikes to augment the lump breaking action as the latter impinge against the breaker bar. Thus the breaker operates to prevent any oversize lumps from passing under the breaker into the delivery portion of the machine and at the same time combs and "homogenizes" the product being delivered. The rotor 32 is preferably provided with fly wheels as indicated at 43—43 to smooth out the rotor operation and to maintain substantially uniform speed of rotation despite varying loads thereon and/or power surges. The dimensioning of the breaker arms and points, and their relative spacings, will of course be selected so as to provide the preferred degree of feed material size reduction.

As stated hereinabove, the rotor device is mounted upon pivot bearings 35—35 relative to the keel structure of the machine, whereby the rotor and breaker bar may rock upwardly as a unit on occasion so as to avoid disastrous jamming of the machine such as in event of excessive overloading at the throat of the machine. The freedom of the rocker unit to thus retreat from its normal operative position (as shown in solid lines in FIG. 2, such as to the broken line showing thereof) may be conveniently controlled by means of devices such as hydraulic shock absorbers 50—50 disposed at opposite sides of the unit. Hydraulic jack devices as indicated at 52—52 may also be similarly located for lifting the breaker unit for maintenance purposes or for adjusting its head room height above the conveyor. As indicated at 54—54 (FIGS. 3, 5), resilient bumper blocks may be provided at opposite sides of the machine frame for bottoming support of the vertically pivotable rotor unit, and chains as indicated at 55 may be used to limit the upward movement of the rotor unit.

As shown in FIGS. 1, 2, and as explained hereinabove, the machine keel structure 22 provides integral structural support for the hopper and conveyor and breaker components, as well as for the motor and drive mechanisms for the conveyor and the breaker. For convenience in handling the machine, for example incidental to dragging the machine from place to place in a coal mine or the like, the rear end of the keel structure may conveniently include a bottom skid member 60, while a laterally disposed cross pad and skid device as indicated at 62 may be included under the front end of the machine.

FIGS. 6, 7, illustrate another form of rotor arrangement wherein a plurality of rotor discs 70 are fixed to the rotor shaft 32 in a plan view zig-zag configuration (FIG. 6); each disc having at corner portions thereof radially extending and circumferentially directed breaker points as indicated at 72. This construction provides a somewhat different material tilling and integrating effect, and may be preferred according to the handling characteristics of the material to be processed.

It will be appreciated that it is a particular feature of the machine of the invention that the conveyor component continuously drags a substantially uniform stream of coal into the throat of the machine and under the position of the breaker component. At this station the breaker arms operate to impinge against the oversize lumps and to "till" the mixture of lumps and smaller particles and to comb upwardly and out of the mixture the undesirably large lumps, and to throw these against the breaker bar. From thence the shattered material falls back upon the moving load for reprocessing by the breaker device until all the material is small enough to go through the throat of the machine for delivery to the associated conveyor belt or the like.

Any overload lumps will thus be repeatedly raked out of the load if necessary and thrown against the breaker bar until they are properly sized for delivery. Thus a substantially uniformly sized and homogeneously mixed load of coal or the like will finally be delivered at reduced and substantially uniform rate of travel off the delivery end of the machine. The homogeneous nature of the product mixture gives it improved handling characteristics whereby the receiving conveyor or the like is enabled to smoothly accommodate and handle a larger continuous loading of the product material than if it were in the form of a more heterogeneous mixture. Also it should be noted that the "tilling" action of the breaker arms while working upon the load is directed substantially horizontally (as distinguished from vertically downwardly toward the conveyor) so that the breaker operation imposes only slight added stresses against the conveyor and/or its support devices such as would introduce conveyor maintenance problems.

It will of course be appreciated that although only one specific form of the invention has been illustrated and described in detail herein, various changes may be made therein without departing from the present invention.

For example, various other types of conveyor devices may be employed in lieu of the specific form shown herein. Also, the hopper component may be modified in design to accommodate the machine to various environmental conditions, and according to the type equipment to be employed in feeding the machine of the invention. Also, the breaker component may include structural changes from the specific form shown herein; and it will of course be understood that the power and power control devices for the conveyor and breaker components may be of any preferred form and perhaps other than shown in the drawing herewith.

I claim:

1. A machine for receiving loads of discrete, random sized materials and reducing the oversized pieces thereof and delivering a substantially constant flow of uniformly sized and mixed product, said machine comprising a base member, a conveyor mounted on said base member and operable to drag material loaded thereon and to carry it through a throat portion of said machine, a breaker mounted on said base member above the position of said conveyor adjacent said throat portion, said breaker comprising a rotor having means extending therefrom and raking into the load being carried by said conveyor, power means mounted on said machine and coupled to said rotor to drive it, a breaker plate disposed adjacent said rotor and above the load carried by said conveyor and at a position in line with the throwing of oversized lump material from out of the load by said rotor, whereby said rotor operates to shatter oversize pieces of load material and to till the load material as it passes under the breaker while oversized pieces are combed out of the load and are thrown upwardly against said breaker plate until reduced to prescribed size when they are permitted to pass through the throat of the machine for delivery therefrom.

2. A machine for receiving discrete, random-sized materials and reducing the oversized pieces thereof and delivering a substantially constant flow of uniformly mixed product, said machine comprising a base member, a conveyor mounted on said base member and operable to carry feed material through an exit portion of said machine, a breaker mounted on said base member adjacent said exit portion, said breaker comprising a rotor having means extending therefrom and raking into the load being carried by said conveyor through said exit, a breaker abutment disposed adjacent said rotor and at a position in line with the throwing of oversized lump material from out of the load by said rotor, whereby said rotor operates to shatter oversize pieces of load material and to till the load material as it passes the breaker while oversized pieces are combed out of the load and are thrown against said abutment until reduced to prescribed size when they are permitted to pass through the delivery portion of said machine.

3. A machine for receiving fluctuant loads of discrete, random sized materials and reducing the oversized pieces thereof and delivering a substantially constant flow of uniformly sized and mixed product, said machine comprising a base member, a feed material receiving hopper mounted upon said base member and having a material exit throat portion, a conveyor mounted on said base member beneath said hopper and operable to drag material therefrom and to carry it through said throat portion of said hopper, a vertically swingable frame mounted on said base member above the position of said conveyor adjacent said throat portion, a breaker carried by said frame, said breaker comprising a rotor having arms extending radially therefrom and raking into the load being carried by said conveyor, power means mounted on said machine and coupled to said rotor to drive it in such direction that said arms rake through the conveyor load in opposition to the direction of conveyor travel, a breaker plate disposed behind said rotor and above the load carried by said conveyor and at a position in line with the throwing of oversized lump material from out of the load by the rotating arms, whereby said breaker arms operate to shatter oversize pieces of load material and to till the load material as it passes under the breaker while oversized pieces are combed out of the load and are thrown upwardly against said breaker plate until reduced to prescribed size, and whereby said breaker may swing upwardly away from said conveyor when the latter becomes overloaded to prevent jamming of the machine.

4. A machine for receiving varying loads of discrete, random-sized materials and reducing the oversized pieces thereof and delivering a substantially constant flow of uniformly mixed product, said machine comprising a base member, a feed material receiving hopper mounted upon said base member and having a material exit portion, a conveyor mounted on said base member and operable to draw material from said hopper and to carry it through said exit portion of said hopper, a rotor mounted on said base member adjacent said throat portion, said rotor having means extending therefrom and raking into the load being carried by said conveyor after passing through said exit, a breaker disposed adjacent said rotor and at a position in line with the throwing of oversized lump material from out of the load by the rotating means, whereby said rotor operates to shatter oversize pieces of load material and to till the load material as it passes the rotor while oversized pieces are combed out of the load by the rotor and are thrown against said breaker until reduced to prescribed size when they are permitted to pass through the delivery portion of said machine.

5. A machine for receiving discrete, random-sized materials and reducing the oversized pieces thereof and delivering a substantially constant flow of uniformly mixed product, said machine comprising a base member, a conveyor mounted on said base member and operable to carry feed material through an exit portion of said machine, a frame pivotally mounted upon said base member and straddling said conveyor, a rotor mounted on said frame, said rotor having means extending therefrom raking into the load being carried by said conveyor after passing through said exit, said rotor and frame being adapted to swing away from said conveyor when overloaded, a breaker abutment disposed adjacent said rotor and at a position in line with the throwing of oversized lump material from out of the load by the rotating means, whereby said rotor operates to shatter oversize pieces of load material and to till the load material as it passes the rotor while oversized pieces are combed out of the load by the rotor and are thrown against said breaker abutment until reduced to prescribed size when they are permitted to pass through the delivery portion of said machine.

6. A machine for receiving discrete, random-sized materials and reducing the oversized pieces thereof and delivering a substantially constant flow of uniformly sized and mixed product, said machine comprising a base member, a feed material receiver mounted upon said base member and having a material exit portion, a conveyor mounted on said base member adjacent said receiver and operable to feed material therefrom through said exit portion of said receiver, a swingable frame mounted on said base member, a rotor carried by said frame, said rotor having means extending therefrom raking into the load being carried by said conveyor from said exit, power means mounted on said machine and coupled to said rotor to drive it to rotate, a breaker abutment disposed adjacent said rotor and at a position in line with the throwing of oversized lump material from out of the load by the rotor, whereby said rotor operates to shatter oversize pieces of load material and to till the load material as it reaches the rotor while oversized pieces are hammered and combed out of the load and are thrown against said breaker abutment until reduced to prescribed size, and whereby said rotor may swing away from said conveyor when the latter becomes overloaded to prevent jamming of the machine.

7. A machine for receiving coal or the like and reducing the oversized pieces thereof and delivering a substantially constant flow of uniformly sized and mixed product, said machine comprising a base member, a feed material receiving hopper mounted upon said base member and having a material exit throat portion, a pair of convergently related conveyors mounted on said base member beneath said hopper and operable to gather and drag material therefrom and to funnel it through said throat portion of said hopper, a vertically swingable frame mounted said base member above the position of said conveyor adjacent said throat portion, a rotor carried by said frame, means damping vertical swinging of said frame and rotor unit, said rotor having arms extending radially therefrom and hammering into the load being carried by said conveyor and tilling the load thereon, power means mounted on said machine and coupled to said rotor to drive it in such direction that said arms rake through the conveyor load, a breaker plate disposed adjacent said rotor and above the load carried by said conveyor and at a position in line with the throwing of oversized lump material from out of the load by the rotating arms, whereby said rotor arms operate to shatter oversize pieces of load material and to till the load material as it passes under the rotor while oversized pieces are combed out of the load and are thrown upwardly against said breaker plate until reduced to prescribed size, and whereby said rotor may swing upwardly away from said conveyor when the latter becomes overloaded to prevent jamming of the machine.

8. A machine for receiving varying loads of run-of-mine coal or the like and reducing the oversized pieces thereof and delivering a substantially constant flow of uniformly mixed product, said machine comprising a base member, a feed material receiving hopper mounted upon said base member and having a material exit portion, a plurality of convergently related conveyors mounted on said base member and operable to gather and draw material from said hopper and to funnel it through said exit portion of said hopper, a rotor mounted on said base member beyond said exit portion, said rotor having means extending therefrom hammering and raking into the load being carried by said conveyor after passing through said exit, a breaker disposed adjacent said rotor and at a position in line with the throwing of oversized lump material from out of the load by the said rotor rotating means, whereby said rotor operates to shatter oversize pieces of load material and to till the load material as it passes the rotor while oversized pieces are combed out of the load by the rotor and are thrown against said breaker until reduced to prescribed size when they are permitted to pass through the delivery portion of said machine.

References Cited in the file of this patent

UNITED STATES PATENTS 1,280,838   Rapp ------------------ Oct. 8, 1918

UNITED STATES PATENT OFFICE
CERTIFICATE OF CORRECTION

Patent No. 3,061,210           October 30, 1962

Louis P. Schaeffer

It is hereby certified that error appears in the above numbered patent requiring correction and that the said Letters Patent should read as corrected below.

Column 3, line 52, for "overload" read -- oversized --; column 6, line 20, after "mounted" insert -- on --.

Signed and sealed this 15th day of January 1963.

(SEAL)
Attest:

ERNEST W. SWIDER
Attesting Officer

DAVID L. LADD
Commissioner of Patents